United States Patent
Im

(10) Patent No.: US 9,423,155 B2
(45) Date of Patent: Aug. 23, 2016

(54) SOLAR ENERGY COLLECTOR AND SYSTEM FOR USING SAME

(71) Applicant: Do Sun Im, Norfolk, VA (US)

(72) Inventor: Do Sun Im, Norfolk, VA (US)

(*) Notice: Subject to any disclaimer, the term of this patent is extended or adjusted under 35 U.S.C. 154(b) by 349 days.

(21) Appl. No.: 14/041,337

(22) Filed: Sep. 30, 2013

(65) Prior Publication Data

US 2015/0090250 A1     Apr. 2, 2015

(51) Int. Cl.
| | |
|---|---|
| *F24J 2/05* | (2006.01) |
| *F24J 2/08* | (2006.01) |
| *F24J 2/10* | (2006.01) |
| *F24J 2/50* | (2006.01) |

(52) U.S. Cl.
CPC .. *F24J 2/055* (2013.01); *F24J 2/08* (2013.01); *F24J 2/10* (2013.01); *F24J 2/50* (2013.01); *Y02E 10/44* (2013.01)

(58) Field of Classification Search
CPC ..................................... F24J 2/055; F24J 2/05
USPC .................... 126/652, 654, 684, 605
See application file for complete search history.

(56) References Cited

U.S. PATENT DOCUMENTS

| | | | |
|---|---|---|---|
| 3,987,781 A | 10/1976 | Nozik et al. | |
| 4,236,506 A | 12/1980 | Roark | |
| 4,333,447 A * | 6/1982 | Lemrow | F24J 2/055 126/657 |
| 5,261,390 A | 11/1993 | Lasich | |
| 6,776,154 B2 | 8/2004 | Yogev | |
| 6,899,097 B1 | 5/2005 | Mecham | |
| 7,637,259 B2 | 12/2009 | Kuckelkorn et al. | |
| 7,863,517 B1 | 1/2011 | DiDomenico | |
| 8,188,366 B2 | 5/2012 | Hecht | |
| 8,276,379 B2 | 10/2012 | Logan et al. | |
| 8,378,280 B2 | 2/2013 | Mills et al. | |
| 8,397,505 B2 | 3/2013 | Penciu | |
| 8,410,351 B1 | 4/2013 | Gu | |
| 8,471,142 B1 | 6/2013 | Yu | |
| 8,471,187 B2 | 6/2013 | Kinley | |
| 8,479,515 B2 | 7/2013 | Coffey et al. | |
| 8,513,515 B1 | 8/2013 | Gu | |
| 2007/0209658 A1 | 9/2007 | Riffelmann et al. | |
| 2012/0174582 A1 | 7/2012 | Moussavi | |
| 2013/0213387 A1* | 8/2013 | Stettenheim | F24J 2/055 126/654 |

FOREIGN PATENT DOCUMENTS

WO    WO 2012-130283 A2    10/2012

\* cited by examiner

*Primary Examiner* — Avinash Savani
(74) *Attorney, Agent, or Firm* — Hammer & Associates, P.C.

(57) ABSTRACT

A solar energy collector includes a first member having a cavity and a longitudinal axis. The first member has a longitudinal window forming a part thereof and a body forming another part thereof. The longitudinal window is made of a material adapted to be transparent to solar radiation. The body has an exterior absorptive surface and an interior reflective surface. A second member is located within the cavity of the first member and is generally parallel to longitudinal axis of the first member. The second member is adapted to carry an energy absorbing fluid. An insulative material fills the cavity between the first member and the second member. A solar energy collection system includes the form going solar energy collector and a solar energy transmitting device for directing solar energy through the window of the collector.

13 Claims, 2 Drawing Sheets

SOLAR ENERGY COLLECTOR AND SYSTEM FOR USING SAME

FIELD OF THE INVENTION

The present invention is directed to a solar energy collector and a system for using same.

BACKGROUND OF THE INVENTION

Solar energy is a renewable energy source. There is ongoing development of ways to bring solar energy into a commercial status by increasing its conversion efficiency.

Solar energy refers to the radiant energy (heat and light) produced by the Sun and captured, for example, on the Earth. It is estimated that about $3.8 \times 10^6$ exajoules (EJ) per year of solar energy is absorbed by the Earth. If some of this solar energy can be harnessed for use, it could have a significant impact on energy supply/demand.

Solar energy technologies generally are categorized into either passive or active capture categories. Active capture refers to, for example, the use of photovoltaic panels or solar thermal collectors. While passive capture refers to, for example, orienting buildings, or choosing materials, or designing spaces to maximize solar energy use.

Captured thermal solar energy may be used in a variety of applications, such as, but not limited to, water heating, space heating, space cooling, and process heat generation. In the capture of thermal solar energy, it is important to make the collector as efficient as possible, so that the return on the capital employed may be maximized.

Accordingly, there is a need for a solar energy collector that efficiently captures solar energy.

SUMMARY OF THE INVENTION

A solar energy collector includes a first member having a cavity and a longitudinal axis. The first member has a longitudinal window forming a part thereof and a body forming another part thereof. The longitudinal window is made of a material adapted to be transparent to solar radiation. The body has an exterior absorptive surface and an interior reflective surface. A second member is located within the cavity of the first member and is generally parallel to longitudinal axis of the first member. The second member is adapted to carry an energy absorbing fluid. An insulative material fills the cavity between the first member and the second member. A solar energy collection system includes the form going solar energy collector and a solar energy transmitting device for directing solar energy through the window of the collector.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
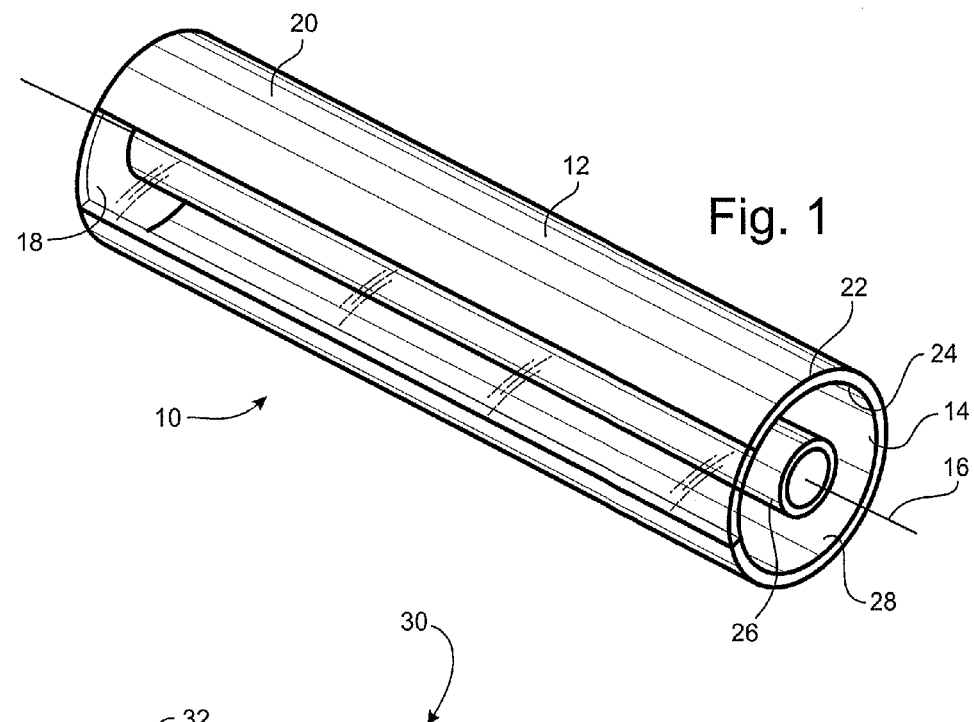
FIG. 1 is an illustration of the solar energy collector.

Referring to the drawings, where like numerals refer to like elements, there is shown in FIG. 1 a solar energy collector 10.

In general, collector 10 comprises a first member 12 and a second member 26 with an insulative material located between the first member 12 and second member 22.

First member 12 is generally an elongated member having a longitudinal axis 16. Member 12 may have any cross-section shape; in one embodiment, the cross-sectional shape is circular (i.e., first member 12 is a tube). First member 12 has a cavity 14. First member 12 includes a longitudinal window 18 forming a part of the member 12 and a body 20 forming another part of member 12.

Window 18 is generally parallel to the longitudinal axis 16. Window 18 may form a part of the wall of member 12. Window 18 is adapted to transmit solar energy into cavity 14. Window 18 should not allow solar energy to escape from the cavity 14. In this regard, window 18 may be an 'one-way' mirror that allows radiation in, but prevents it escape, such as provided by a polarized film. Window 18 may be glass or plastic.

Body 20 may form the rest of the first member 12. Body 20 has an exterior (or outer) surface 22 and an interior (or inner) surface 24. The choice of material for the body 20 may be dependent of several factors including: strength at the maximum anticipated temperature, insulative properties, resistance to corrosion, and cost, to name a few.

The exterior surface 22 is adapted to absorb solar radiation. The exterior surface 22 may be a coating on the body or may be layer laminated to the body or may be integral with the body. In one embodiment, the exterior surface 22 may be a black surface, so as to simulate an idealized black body. The idealized black body may be characterized as a physical body that absorbs all incident electromagnetic radiation (including solar radiation), regardless of frequency or angle of incident.

The interior surface 24 is adapted to reflect solar radiation. The interior surface 24 may be a coating on the body or may be layer laminated to the body or may be integral with the body. In one embodiment, the interior surface 24 is a mirrored surface, so as to reflect all radiation incident to it without absorbing any of that radiation.

Second member 26 is generally an elongated member having a longitudinal axis. Second member 26 may be located anywhere within cavity 14 of the first member 12. Member 26 may have any cross-section shape; in one embodiment, the cross-sectional shape is circular (i.e., second member 26 is a tube). In one embodiment, the second member 26 is co-axial with the axis 16 of the first member 12. Second member 26 is adapted, in one aspect, to carry an energy absorbing fluid therethrough. Second member 26 is also adapted, in another aspect, to capture solar energy or allow the solar energy to pass, efficiently, to the energy absorbing fluid. With regard to the later aspect, second member 26 may be black, so as to simulate the idealized black body, discussed above. Second member 26 may be made of glass (e.g., Pyrex), quartz, ceramic, plastic, metal, or combinations thereof. The choice of material for the second member 26 may be dependent of several factors including: strength at the maximum anticipated temperature, insulative properties, resistance to corrosion, and cost, to name a few.

The gap or space between the body 20 and the second member 26 may be any distance. Several considerations must be kept in mind when considering the width of the this gap. Those considerations include: the focal length and dimension of the solar energy director, discussed below; the lager the diameter of the body 20, the better for collecting solar radiation, but the worse for thermal insulation.

The energy absorbing fluid may be any fluid. For example, the fluid may be either a liquid or a gas. The choice of the fluid is not limiting, and may be dictated by how the captured energy is to be subsequently used. In one embodiment, the energy absorbing fluid may be a mixture of water and ethylene glycol. In another embodiment, the energy absorbing fluid may be water.

Insulative material 28 occupies the space between the first member 12 and the second member 26. Insulative material 28 may be any material adapted to transmit the solar energy entering the window 18 as efficiently as possible (i.e., absorbing as little radiant energy as possible). Insulative material may be a fluid or a vacuum. The fluid may be a gas.

Figure 2:
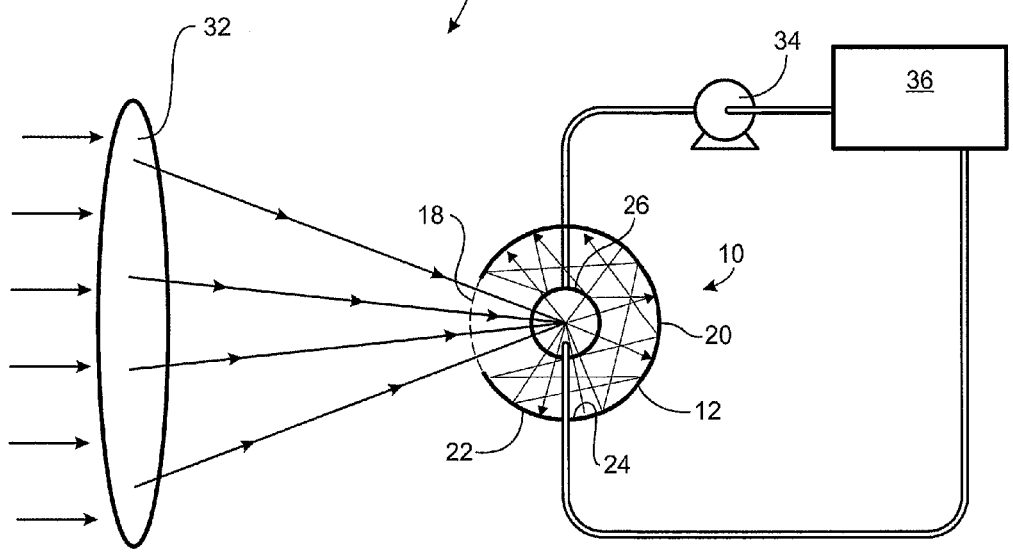
FIG. 2 is an illustration of one embodiment of the system for using the solar energy collector.
Figure 3:
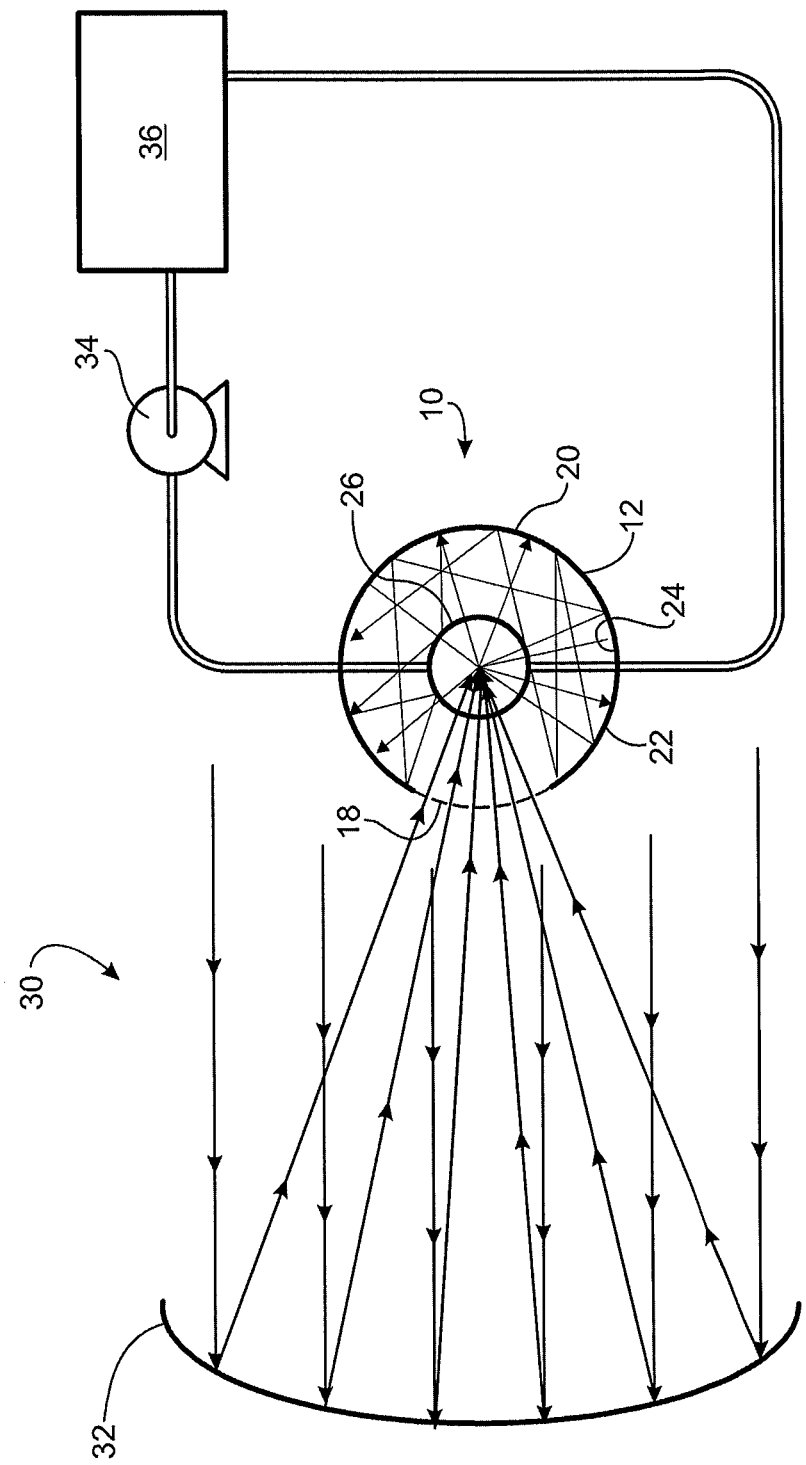
FIG. 3 is an illustration of another embodiment of the system for using the solar energy collector.

Referring to FIGS. 2 and 3, system 30 for utilizing solar energy collector 10 are illustrated. In general, system 30 includes the solar energy collector 10, a solar energy director 32, a energy absorbing fluid mover 34, and thermal energy utilizer 36.

The solar energy director 32 directs and concentrates the solar radiation. Director 32 may be a lens (FIG. 2) or a reflector (FIG. 3). Director 32 may be elongated and with an axis generally parallel to the axis 16 of the first member 12. The focal point of the director may be positioned so as to direct the focused radiation at the second member 26 of the collector 10. The lens may be any lens; in one embodiment may be a convex lens. The lens may also be Fresnel lens. The reflector may be any reflector or mirror. In one embodiment, the reflector may be a parabolic reflector.

The energy absorbing fluid mover 34 may be device adapted to move the fluid around the system 30. In one embodiment, the mover 34 may be a pump (if the fluid is a liquid). In another embodiment, the mover 34 may be a compressor (if the fluid is a gas).

The thermal energy utilizer 36 may be any device adapted to use the energy absorbed in the energy absorbing fluid pasted from the collector 10. For example, the utilizer 36 may be used for water heating, space heating, space cooling, and process heat generation or to pre-heat fluids used in any of those operations.

EXAMPLES

In the following example, the inventive collector is compared to a conventional collector to demonstrate the efficacy of the inventive collector. The tests were performed on a sunny day with an ambient temperature of 90° F., and all tested were exposed to sunlight for 5 minutes (tests were run simultaneously). In each, 5 cc of tap water was placed in a test tube (simulating the second member) with a thermometer for measuring the temperature of the water. Test 1-3 are of conventional set-ups, while test 4 is directed to the inventive collector. In test 1, the water in the test tube was heated without any director or the first member and the temperature reached 110° F. In test 2, the water was heated, in the test tube, using a 2×4 inch parabolic mirror with its focal line directed on the test tube and the temperature reached 120° F. In test 3, the water was heated, in the test tube, using a lens with its focal line directed on the test tube and the temperature reached 120° F. In test 4, the water was heated, in the test tube and the first member, using a 2×4 inch cylindrical convex lens with its focal line directed through the window and on the test tube and the temperature reached 139° F.

The present invention may be embodied in other forms without departing from the spirit and the essential attributes thereof, and, accordingly, reference should be made to the appended claims, rather than to the foregoing specification, as indicating the scope of the invention.

I claim:

1. A solar energy collector comprising:
   a first tubular member having a circular cross-section, a first end, a second end, a cavity, and a longitudinal axis, the first member consisting of a longitudinal one-way mirrored window extending the entire length between the first end and the second end of the first member and forming a part of the first member and a body forming the rest of the first member, said longitudinal one-way mirrored window being made of a material adapted to pass solar radiation, said body having an exterior absorptive surface and an interior reflective surface, the interior reflective surface covering the entire interior surface of the body;
   a second tubular member having a circular cross-section, being located within the cavity of the first member and generally parallel to said longitudinal axis, and being surrounded by the interior reflective surface of the first member, said second member being adapted to carry an energy absorbing fluid; and
   an insulative material filling the cavity between the first member and the second member, said insulative material being a fluid or a vacuum.

2. The solar energy collector of claim 1 wherein said material adapted to pass solar energy being selected from the group consisting of: glass, plastic, or combinations thereof.

3. The solar energy collector of claim 1 wherein said exterior absorptive surface being a black surface.

4. The solar energy collector of claim 1 wherein said interior reflective surface being a mirrored surface.

5. The solar energy collector of claim 1 wherein said fluid being a gas.

6. A solar energy collection system comprising:
   a solar energy collector comprising a first tubular member having a circular cross-section, a first end, a second end, a cavity, and a longitudinal axis, the first member consisting of a longitudinal one-way mirrored window extending the entire length between the first end and the second end of the first member and forming a part of the first member and a body forming the rest of the first member, said longitudinal one-way mirrored window being made of a material adapted to pass solar radiation, said body having an exterior absorptive surface and an interior reflective surface, the interior reflective surface covering the entire interior surface of the body; a second tubular member having a circular cross-section, being located within the cavity of the first member and generally parallel to said longitudinal axis, and being surrounded by the interior reflective surface of the first member, said second member being adapted to carry an energy absorbing fluid; and an insulative material filling the cavity between the first member and the second member, said insulative material being a fluid or a vacuum, and
   a solar energy transmitting device adapted to direct solar energy through said window.

7. The solar energy collection system of claim 6 wherein said solar energy transmitting device being a lens or a mirror.

8. The solar energy collector of claim 6 wherein said material adapted to pass solar energy being selected from the group consisting of: glass, plastic, or combinations thereof.

9. The solar energy collector of claim 6 wherein said exterior absorptive surface being a black surface.

10. The solar energy collector of claim 6 wherein said interior reflective surface being a mirrored surface.

11. The solar energy collector of claim 6 wherein said fluid being a gas.

12. The solar energy collector of claim 1, wherein the second tubular member being generally co-axial with said longitudinal axis.

13. The solar energy collector of claim 6, wherein the second tubular member being generally co-axial with said longitudinal axis.

* * * * *